US012456735B2

(12) United States Patent
Lee

(10) Patent No.: US 12,456,735 B2
(45) Date of Patent: Oct. 28, 2025

(54) NEGATIVE ELECTRODE AND SOLID-STATE SECONDARY BATTERY INCLUDING THE SAME

(71) Applicant: Samsung SDI Co., Ltd., Yongin-si (KR)

(72) Inventor: Minsuk Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/249,046

(22) Filed: Feb. 18, 2021

(65) Prior Publication Data

US 2021/0257624 A1 Aug. 19, 2021

(30) Foreign Application Priority Data

Feb. 18, 2020 (KR) ........................ 10-2020-0019993

(51) Int. Cl.
*H01M 4/66* (2006.01)
*H01M 4/02* (2006.01)
*H01M 4/131* (2010.01)
*H01M 4/133* (2010.01)
*H01M 4/134* (2010.01)
(Continued)

(52) U.S. Cl.
CPC ........... *H01M 4/667* (2013.01); *H01M 4/133* (2013.01); *H01M 4/134* (2013.01); *H01M 4/622* (2013.01); *H01M 4/661* (2013.01); *H01M 10/0525* (2013.01); *H01M 10/0562* (2013.01); *H01M 2004/027* (2013.01); *H01M 4/131* (2013.01); *H01M 2300/0068* (2013.01)

(58) Field of Classification Search
CPC ...... H01M 4/667; H01M 4/133; H01M 4/134; H01M 4/622; H01M 4/661; H01M 10/0525; H01M 10/0562; H01M 4/131; H01M 2004/027; H01M 2300/0068
See application file for complete search history.

(56) References Cited

U.S. PATENT DOCUMENTS 9,172,085 B2    10/2015  Divigalpitiya
2016/0156021 A1  6/2016  Aihara et al.
(Continued)

FOREIGN PATENT DOCUMENTS

EP   2731183 A1   5/2014
EP   3399584 A1   11/2018
(Continued)

OTHER PUBLICATIONS

Extended European Search Report issued Jun. 8, 2021 for corresponding EP Application No. 21157714.3 (5 pages).
(Continued)

*Primary Examiner* — Brian R Ohara
*Assistant Examiner* — Emily Elizabeth Freeman
(74) *Attorney, Agent, or Firm* — Womble Bond Dickinson (US) LLP

(57) ABSTRACT

A negative electrode includes a negative electrode current collector and a first negative electrode active material layer on the negative electrode current collector, wherein the negative electrode current collector includes a first metal substrate including a first metal, and a coating layer positioned on the first metal substrate and containing a second metal, the second metal having a greater Mohs hardness than the first metal.

19 Claims, 7 Drawing Sheets

(51) Int. Cl.
*H01M 4/62* (2006.01)
*H01M 10/0525* (2010.01)
*H01M 10/0562* (2010.01)

(56) References Cited

U.S. PATENT DOCUMENTS

| | | | |
|---|---|---|---|
| 2016/0294003 A1* | 10/2016 | Yamamoto | C01G 17/006 |
| 2017/0194672 A1 | 7/2017 | Weber et al. | |
| 2017/0207482 A1 | 7/2017 | Tomura et al. | |
| 2018/0226633 A1 | 8/2018 | Fujiki et al. | |
| 2019/0051925 A1 | 2/2019 | Li et al. | |
| 2019/0051933 A1 | 2/2019 | Li et al. | |
| 2019/0067680 A1* | 2/2019 | Ohsawa | H01M 4/66 |
| 2019/0260065 A1 | 8/2019 | Yashiro et al. | |
| 2019/0315093 A1* | 10/2019 | Nishio | B32B 15/08 |
| 2020/0227757 A1 | 7/2020 | Imai | |
| 2020/0350619 A1* | 11/2020 | Yasuda | H01M 10/0525 |
| 2020/0403230 A1* | 12/2020 | Hong | H01M 4/134 |
| 2022/0149354 A1* | 5/2022 | Omura | H01M 4/366 |

FOREIGN PATENT DOCUMENTS

| | | |
|---|---|---|
| JP | 2012-049023 A | 3/2012 |
| JP | 2015069848 A * | 4/2015 |
| JP | 2015-176819 A | 10/2015 |
| JP | 2016-048651 A | 4/2016 |
| JP | 2017-130281 A | 7/2017 |
| JP | 2019-145299 A | 8/2019 |
| KR | 10-2002-0094530 A | 12/2002 |
| KR | 10-2014-0051375 A | 4/2014 |
| KR | 10-2016-0064942 A | 6/2016 |
| KR | 10-2018-0091678 A | 8/2018 |
| KR | 10-2019-0017649 A | 2/2019 |
| KR | 10-2019-0017661 A | 2/2019 |
| KR | 10-2019-0057966 A | 5/2019 |
| KR | 10-2019-0100078 A | 8/2019 |
| WO | 2014-162532 A1 | 10/2014 |
| WO | 2019-078093 A1 | 4/2019 |

OTHER PUBLICATIONS

Japanese Office action dated Jan. 11, 2022, in corresponding Japanese Patent Application No. 2021-023693 (4 pages).
Japanese Office Action dated Aug. 23, 2022 in corresponding JP Patent Application No. 2021-023693 (5 pages).
Chinese Office Action issued Jan. 4, 2024, in CN Patent Application No. 202110189859.1, with English Translation (14 pages).
Korean Office Action dated Apr. 10, 2025, issued in Korean Patent Application No. 10-2020-0019993, 7 pages.

* cited by examiner

NEGATIVE ELECTRODE AND SOLID-STATE SECONDARY BATTERY INCLUDING THE SAME

CROSS-REFERENCE TO RELATED APPLICATION

This application claims priority to and the benefit of Korean Patent Application No. 10-2020-0019993, filed on Feb. 18, 2020, in the Korean Intellectual Property Office, the entire content of which is incorporated herein by reference.

BACKGROUND

1 Field

One or more embodiments of the disclosure relate to a negative electrode and a solid-state secondary battery.

2 Description of Related Art

Recently, efforts to develop batteries having high energy density and improved safety have increased in response to industrial demand. For example, lithium ion batteries have been put to practical use in automobiles, as well as information related appliances and communication devices. In the field of automobiles, safety is particularly stressed because a failure could cause harm to lives.

Because currently available lithium ion batteries include electrolytes containing combustible organic solvents, there is a possibility of either overheating and/or fire when a short circuit occurs. Accordingly, there remains a need for solid-state batteries using solid electrolytes instead of liquid electrolytes.

The solid-state batteries do not include combustible organic solvents, and may thus significantly reduce the chances of causing fire or an explosion despite the occurrence of a short circuit. Therefore, the solid-state batteries may provide greater safety than lithium-ion batteries using liquid electrolytes.

SUMMARY

One or more aspects of embodiments of the present disclosure are directed toward a negative electrode having a new structure.

One or more aspects of embodiments of the present disclosure are directed toward a solid-state secondary battery including a negative electrode having a new structure.

Additional aspects will be set forth in part in the description which follows and, in part, will be apparent from the description, or may be learned by practice of the presented embodiments of the disclosure.

According to one or more embodiments,
a negative electrode includes a negative electrode current collector and a first negative electrode active material layer on the negative electrode current collector,
wherein the negative electrode current collector includes a first metal substrate including a first metal, and a coating layer on the first metal substrate, the coating layer containing a second metal,
the second metal having a greater Mohs hardness than the first metal (e.g., the second metal being greater in Mohs hardness than the first metal).

According to one or more embodiments,
a solid-state secondary battery includes a positive electrode;
a negative electrode according to the above; and
a solid electrolyte layer between the positive electrode and the negative electrode,
wherein the solid electrolyte layer includes a sulfide-based solid electrolyte.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
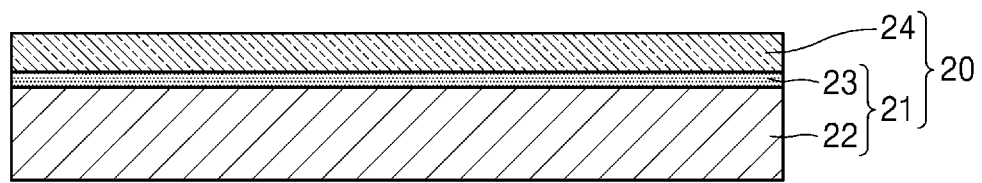
FIG. 1 is a cross-sectional view of a negative electrode according to one or more embodiments.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," "one of", and "selected from", when preceding a list of elements, modify the entire list of elements and do not modify the individual elements of the list. Further, the use of "may" when describing embodiments of the present disclosure refers to "one or more embodiments of the present disclosure".

As used herein, the terms "use," "using," and "used" may be considered synonymous with the terms "utilize," "utilizing," and "utilized," respectively. As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "main component" or "major component" refers to a component that is present in a composition, polymer, or product in an amount greater than an amount of any other single component in the composition or product.

In this context, "substantially consisting of" means that any additional components will not materially affect the chemical, physical, optical or electrical properties of the semiconductor film.

In a process of charging/discharging a solid-state secondary battery, a metal layer containing lithium is plated (e.g., precipitated) on a negative electrode current collector and the plated metal layer containing lithium dissolves in the solid electrolyte layer. As the charging/discharging of the solid-state secondary battery is repeated, the lithium-containing metal layer plated on the negative electrode current collector includes impurities remaining in the electrode, decomposition products of a solid electrolyte, etc. Accordingly, with these impurities being included, the lithium-containing metal layer ends up having a rough and hard surface. The lithium-containing metal layer having the rough surface forms irregularities such as scratches on the negative electrode current collector, and these irregularities, such as scratches on the negative electrode current collector, cause the lithium-containing metal layer to be more non-uniformly plated. The non-uniform plating of the lithium-containing metal layer causes non-uniform pressure, etc. which is applied on a solid electrolyte layer in contact with the negative electrode, thereby causing micro-cracks in the solid electrolyte layer, and these cracks of the solid electrolyte layer grow during the process of repeated charging/discharging. These cracks allow lithium to grow, and accordingly may lead to a short circuit between the positive electrode and the negative electrode.

The negative electrode according to one or more embodiments has a new structure that prevents or reduces the deterioration of the negative electrode current collector. Further, an occurrence of short circuit in the solid-state secondary battery may be suppressed or reduced, by employing the negative electrode, and the solid-state secondary battery employing the negative electrode shows improved cycle characteristics.

The present disclosure described below may be modified in various forms and have many embodiments, and particular embodiments are illustrated in the drawings and described in more detail in the detailed description. However, the present disclosure should not be construed as limited to the particular embodiments, but should be understood to cover all modifications, equivalents or replacements included in the technical scope of the present disclosure as defined by the attached claims and their equivalents.

The terminology used herein is for the purpose of explaining particular embodiments only and is not intended to limit the present disclosure. The singular forms include the plural forms as well, unless the context clearly indicates otherwise. It will be further understood that the terms "comprise" or "comprising" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof. "/" used hereinafter may be interpreted as "and" or interpreted as "or" according to circumstances.

In the drawings, the thicknesses of layers and regions are enlarged or reduced for clear explanation. The same reference numerals are designated for similar elements throughout. When a layer, film, region, plate, or the like is referred to as being "on" another part, it can be directly on the other part, or intervening parts may be present. The terms "first", "second", and/or the like may be used for describing various elements throughout, but the elements are not limited by the terms. The terms are used to only distinguish one element from other elements. In the present specification and drawings, elements having substantially the same functional configuration are referred to by the same or similar reference numerals, and descriptions thereof are not repeated.

Hereinafter, a negative electrode and a solid-state secondary battery according to one or more embodiments will be described in more detail.

Negative Electrode

A negative electrode according to one or more embodiments includes a negative electrode current collector and a first negative electrode active material layer disposed (e.g., provided) on the negative electrode current collector, wherein the negative electrode current collector includes a first metal substrate and a coating layer disposed on the first metal substrate and containing a second metal, the second metal having a greater Mohs hardness than the first metal. When the coating layer containing a second metal, which is harder by having a higher Mohs hardness than the first metal, is positioned on the first metal substrate included in the negative electrode current collector, irregularities such as scratches on the first metal substrate due to the lithium-containing metal layer plated in a process of charging/discharging are prevented or reduced. Accordingly, the lithium-containing metal layer formed on the negative electrode current collector in the process of charging/discharging has improved uniformity. Therefore, cracks caused in the solid electrolyte layer in contact with the negative electrode in the process of charging/discharging are prevented or reduced, and thus, a short circuit of the solid-state secondary battery employing the negative electrode is prevented or reduced. As a result, the solid-state secondary battery employing the negative electrode has improved cycle characteristics.

Figure 2:
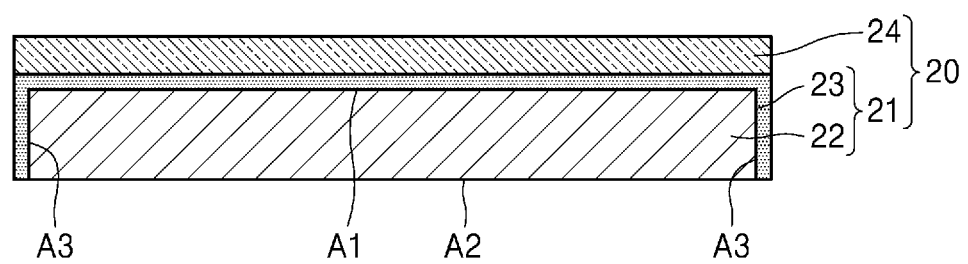
FIG. 2 is a cross-sectional view of a negative electrode according to one or more embodiments.

Referring to FIGS. 1 and 2, a negative electrode 20 includes a negative electrode current collector 21 and a first negative electrode active material layer 24 disposed on the negative electrode current collector 21, wherein the negative electrode current collector 21 includes a first metal substrate 22 (including a first metal) and a coating layer 23 disposed on the first metal substrate 22 and containing a second metal, the second metal having a greater Mohs hardness than the first metal.

Negative Electrode: Negative Electrode Current Collector

Referring to FIG. 1, the negative electrode 20 includes the negative electrode current collector 21. The negative electrode current collector 21 includes the first metal substrate 22 and the coating layer 23 disposed on the first metal substrate 22 and containing the second metal. The second metal has a greater Mohs hardness than the first metal (of the first metal substrate). For example, the coating layer containing the second metal is harder than the substrate containing the first metal, thereby preventing or reducing the deterioration of the first metal substrate.

The first metal substrate 22 contains the first metal as a main component (e.g., major component), e.g., the first metal substrate 22 substantially consists of, is, or consists of the first metal. The first metal included in the first metal substrate 22 is contained, for example, in an amount of 90 wt % or greater, 95% wt % or greater, 99% wt % or greater, or 99.9% wt % or greater with respect to a total weight of the first metal substrate 22. The first metal substrate 22 may be composed of a material that does not react (or substantially does not react) with lithium, for example, a material that does not form an alloy and/or a compound with lithium. The first metal substrate 22 may be a material inert to the lithium. The material constituting the first metal substrate 22 has a Mohs hardness of 5.5 or less. For example, the first metal has a Mohs hardness of 5.5 or less, 5.0 or less, 4.5 or less, 4.0 or less, 3.5 or less, or 3.0 or less. The first metal may have a Mohs hardness of, for example, about 2.0 to about 5.5, about 2.0 to about 5.0, about 2.0 to about 4.5, about 2.0 to about 4.0, about 2.0 to about 3.5, or about 2.0 to about 3.0.

The first metal is, for example, copper (Cu), nickel (Ni), stainless steel (SUS), iron (Fe), and/or cobalt (Co), but is not necessarily limited thereto, and any suitable current collector having a Mohs hardness of 5.5 or less may be used. The first metal substrate 22 may be composed of, for example, one of the above-described metals, or may be composed of an alloy of two or more of the above-described metals. The first metal substrate 22 is, for example, in the form of a sheet or a foil.

The coating layer 23 contains the second metal. The coating layer 23 contains, for example, the second metal as a main component (e.g., major component), substantially consists of the second metal, is the second metal, or consists of the second metal. The second metal included in the coating layer 23 is contained, for example, in an amount of 90 wt % or greater, 95% wt % or greater, 99% wt % or greater, or 99.9% wt % or greater with respect to a total weight of the coating layer 23. The coating layer 23 may be composed of a material that does not react (or substantially does not react) with lithium, for example, a material that does not form an alloy and/or a compound with lithium. The material forming the coating layer 23 may be a material inert to the lithium. The material forming the coating layer 23 has a Mohs hardness of 6.0 or greater. For example, the second metal has a Mohs hardness of 6.0 or greater, 6.5 or greater, 7.0 or greater, 7.5 or greater, 8.0 or greater, 8.5 or greater, or 9.0 or greater. The second metal may have a Mohs hardness of, for example, about 6.0 to about 12, about 6.5 to about 12, about 7.0 to about 12, about 7.5 to about 12, about 8.0 to about 12, about 8.5 to about 12, or about 9.0 to about 12. The second metal may have a Mohs hardness of, for example, about 6.0 to about 10, about 6.5 to about 10, about 7.0 to about 10, about 7.5 to about 10, about 8.0 to about 10, about 8.5 to about 10, or about 9.0 to about 10. When the second metal has an overly low Mohs hardness, it may be hard to prevent or reduce the deterioration of the negative electrode current collector. When the second metal has an overly high Mohs hardness, processing may not be easy.

The second metal is, for example, at least one selected from titanium (Ti), manganese (Mn), niobium (Nb), tantalum (Ta), iridium (Ir), vanadium (V), rhenium (Re), osmium (Os), tungsten (W), chromium (Cr), boron (B), ruthenium (Ru), and rhodium (Rh). The coating layer 23 may be composed of, for example, one of the above-described metals, or may be composed of an alloy of two or more of the above-described metals.

A difference in the Mohs hardness between the first metal included in the first metal substrate 22 and the second metal included in the coating layer 23 may be, for example, 2 or greater, 2.5 or greater, 3 or greater, 3.5 or greater, or 4 or greater. The difference in the Mohs hardness between the first metal and the second metal may allow the negative electrode current collector 21 to be more effectively (or suitably) prevented or reduced from deteriorating.

The coating layer 23 may have a single layer structure or a multilayer structure of two or more layers. The coating layer 23 may have, for example, a two-layer structure having a first coating layer and a second coating layer. The coating layer 23 may have, for example, a three-layer structure having a first coating layer, a second coating layer, and a third coating layer.

The coating layer 23 has, for example, a thickness of 1 μm or less, 900 nm or less, 800 nm or less, 700 nm or less, 600 nm or less, 500 nm or less, 400 nm or less, 300 nm or less, 200 nm or less, or 150 nm or less. The coating layer 23 has, for example, a thickness of about 10 nm to about 1 μm, about 20 nm to about 900 nm, about 30 nm to about 800 nm, about 40 nm to about 700 nm, about 50 nm to about 600 nm, about 50 nm to about 500 nm, about 50 nm to about 300 nm, about 50 nm to about 200 nm, or about 50 nm to about 150 nm. When the coating layer 23 is too thin in thickness, it may be hard to suppress or reduce the non-uniform growth of the lithium-containing metal layer. When the coating layer 23 has a thickness in the range of the present embodiments, the solid-state secondary battery has improved cycle characteristics, but when the coating layer 23 is too thick in thickness, the solid-state secondary battery has a reduced energy density, and the coating layer 23 may not thus be easily formed. The coating layer 23 may be disposed on the first metal substrate 22 through, for example, vacuum vapor deposition, sputtering, or plating, etc., but embodiments are not necessarily limited thereto, and any suitable method(s) capable of forming the coating layer 23 may be used.

The coating layer 23 may be, for example, inert to a solid electrolyte. The coating layer 23 may be, for example, inert to a sulfide-based solid electrolyte. Because the coating layer 23 is inert to the sulfide-based solid electrolyte, the first metal substrate 22 having reactivity with the sulfide-based solid electrolyte may be protected from the sulfide-based solid electrolyte. For example, the coating layer 23 may serve as a protective layer of the first metal substrate 22. For example, in the solid-state secondary battery including the negative electrode 20 containing copper (Cu) as the first metal substrate 22 and a sulfide-based solid electrolyte as a solid electrolyte, the coating layer 23 which is inert to the sulfide-based solid electrolyte is disposed on the first metal substrate 22, and deterioration such as corrosion of a copper (Cu) substrate, which is the first metal substrate 22, due to the sulfide-based solid electrolyte may thus be prevented or reduced.

Referring to FIG. 2, the coating layer 23 may be additionally disposed on a third surface A3, which is a side surface, between a first surface A1 of the first metal substrate 22 facing the coating layer 23 and a second surface A2 of the first metal substrate 22 facing oppositely away from the first surface A1. When the coating layer 23 is disposed on both the first surface A1 and the third surface A3 of the first metal substrate 22, deterioration of the first metal substrate 22 may be more effectively prevented or reduced. The coating layer 23 may be disposed on the third surface A3, of the first metal substrate 22, which is an entire side surface.

The negative electrode current collector 21 including the first metal substrate 22 and the coating layer 23 may have a thickness of, for example, about 5 μm to about 50 μm, about 10 μm to about 50 μm, about 10 μm to about 40 μm, or about 10 μm to about 30 μm, but the thickness is not necessarily limited thereto, and may be selected according to the required characteristics of the solid-state secondary battery.

Negative Electrode: Negative Electrode Active Material

Referring to FIGS. 1 to 4B and 6, negative electrodes 20, 20a, and 20b respectively include first negative electrode active material layers 24, 24a, and 24b disposed on negative electrode current collectors 21, 21a, and 21b. The first negative electrode active material layers 24, 24a, and 24b includes, for example, a negative electrode active material and a binder.

The negative electrode active material included in the first negative electrode active material layers 24, 24a, and 24b is, for example, in the form of particles. The negative electrode active material in the form of particles has, for example, an average particle diameter of about 4 μm or less, about 3 μm or less, about 2 μm or less, about 1 μm or less, about 900 nm or less, about 800 nm or less, about 700 nm or less, about 600 nm or less, about 500 nm or less, about 400 nm or less, about 300 nm or less, about 200 nm or less, or about 100 nm or less. The negative electrode active material in the form of particles has, for example, an average particle diameter of about 10 nm to about 4 μm, about 10 nm to about 3 μm, about 10 nm to about 2 μm, about 10 nm to about 1 μm, about 10 nm to about 900 nm, about 10 nm to about 800 nm, about 10 nm to about 700 nm, about 10 nm to about 600 nm, about 10 nm to about 500 nm, about 10 nm to about 400 nm, about 10 nm to about 300 nm, about 10 nm to about 200 nm, about 10 nm to about 100 nm, or about 20 nm to about 80 nm. When the negative electrode active material has an average particle diameter within these ranges, reversible absorbing and/or desorbing of lithium during charging/discharging may further be facilitated. The average particle diameter of the negative electrode active material may be, for example, a median diameter (D50) measured by using a laser type (or kind) particle size distribution meter.

The negative electrode active material included in the first negative electrode active material layers 24, 24a, and 24b includes, for example, at least one selected from a carbon-based negative electrode active material and a metal and/or metalloid negative electrode active material.

The carbon-based negative electrode active material is, for example, amorphous carbon. Examples of the amorphous carbon may include carbon black (CB), acetylene black (AB), furnace black (FB), ketjen black (KB), and/or graphene, but embodiments are not limited thereto, and any suitable amorphous carbon may be used. The amorphous carbon refers to carbon having no crystallinity or a fairly low crystallinity, which may be distinct from crystalline carbon or graphite-based carbon.

The metal or metalloid negative electrode active material may include at least one selected from the group consisting of gold (Au), platinum (Pt), palladium (Pd), silicon (Si), silver (Ag), aluminum (Al), bismuth (Bi), tin (Sn), and zinc (Zn), but embodiments are not limited thereto, and any suitable material for a metal negative electrode active material or a metalloid negative electrode active material that forms an alloy or a compound with lithium may be used. For example, nickel (Ni) does not form an alloy with lithium and thus is not a metal negative electrode active material in the present specification.

The first negative electrode active material layers 24, 24a, and 24b may include a one-type (or kind) negative electrode active material or a plurality of different types (or kinds) of negative electrode active materials among the negative electrode active materials. For example, the first negative electrode active material layers 24, 24a, and 24b may each independently include amorphous carbon alone or at least one selected from the group consisting of gold (Au), platinum (Pt), palladium (Pd), silicon (Si), silver (Ag), aluminum (Al), bismuth (Bi), tin (Sn), and zinc (Zn). In one or more embodiments, the first negative electrode active material layers 24, 24a, and 24b may include a mixture of amorphous carbon and at least one selected from the group consisting of gold (Au), platinum (Pt), palladium (Pd), silicon (Si), silver (Ag), aluminum (Al), bismuth (Bi), tin (Sn), and zinc (Zn). A mixing ratio of the mixture of amorphous carbon to gold, etc. may be a weight ratio in a range of about 10:1 to about 1:2, about 10:1 to about 1:1, about 7:1 to about 1:1, about 5:1 to about 1:1, or about 4:1 to about 2:1, but is not necessarily limited to thereto, and is selected according to the required characteristics of a solid-state secondary battery 1. When the negative electrode active material has the composition, cycle characteristics of the solid-state secondary battery 1 may further improve.

The negative electrode active material included in the first negative electrode active material layers 24, 24a, and 24b includes, for example, a mixture of first particles composed of amorphous carbon and second particles composed of a metal or metalloid. The metal or metalloid may include, for example, gold (Au), platinum (Pt), palladium (Pd), silicon (Si), silver (Ag), aluminum (Al), bismuth (Bi), tin (Sn), and/or zinc (Zn). The metalloid may be a semiconductor. The second particles are contained in an amount of about 8 wt % to about 60 wt %, about 10 wt % to about 50 wt %, about 15 wt % to about 40 wt %, or about 20 wt % to about 30 wt % with respect to a total weight of the mixture. When the second particles are contained in an amount within these ranges, cycle characteristics of the solid-state secondary battery 1 may further improve.

Negative Electrode: Binder

Examples of the binder included in the first negative electrode active material layers 24, 24a, and 24b may include styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and/or polymethylmethacrylate, but embodiments are not limited thereto, and any suitable binder may be used. The binder may be composed of a single binder or a plurality of different binders.

When the first negative electrode active material layers 24, 24a, and 24b each independently contain a binder, the first negative electrode active material layer(s) 24, 24a, and/or 24b are stabilized on the negative electrode current collector(s) 21, 21a, and/or 21b, respectively. In addition, despite changes in volume and/or a relative position of the first negative electrode active material layer(s) 24, 24a, and/or 24b in the process of charging/discharging, cracks in the first negative electrode active material layer(s) 24, 24a, and/or 24b may be prevented or reduced. For example, when the first negative electrode active material layer(s) 24, 24a, and/or 24b do not contain a binder, the first negative electrode active material layer(s) 24, 24a, and/or 24b may be easily separated from the negative electrode current collector(s) 21, 21a, and/or 21b, respectively. At a portion where the negative electrode current collector(s) 21, 21a, and/or 21b are exposed when the first negative electrode active material layer(s) 24, 24a, and/or 24b are separated from the negative electrode current collector(s) 21, 21a, and/or 21b, respectively, the negative electrode current collector(s) 21, 21a, and/or 21b are in direct contact with the solid electrolyte layer(s) 30, 30a, and/or 30b, respectively, thereby having a higher chance of a short circuit being caused. The first negative electrode active material layers 24, 24a, and 24b are each independently prepared, for example, by having a slurry in which a material constituting the first negative electrode active material layer(s) 24, 24a, and 24b, respectively, is dispersed and/or applied onto the negative electrode current collector(s) 21, 21a, and/or 21b, respectively, and dried. When the binder is included in the first negative electrode active material layer(s) 24, 24a, and/or 24b, stable dispersion of the negative electrode active material in the slurry may be achieved. For example, when the slurry is applied onto the negative electrode current collector(s) 21, 21a, and/or 21b through screen printing, the clogging of the screen (e.g., clogging due to the aggregate of the negative electrode active material) may be prevented or reduced.

The binder contained in the first negative electrode active material layer(s) 24, 24a, and/or 24b may be in an amount of about 1 wt % to about 20 wt %, about 2 wt % to about 15 wt %, or about 3 wt % to about 10 wt % with respect to a total weight of the first negative electrode active material layer(s) 24, 24a, and/or 24b, but the amount is not necessarily limited to thereto, and may be selected according to the characteristics of the solid-state secondary battery.

Negative Electrode: Other Additives

The first negative electrode active material layers 24, 24a, and 24b may each independently further include suitable additive(s) that can be used in a solid-state secondary battery 1, such as a filler, a coating agent, a dispersant, and/or an ion conducting agent, for the purpose of keeping or improving the physical properties of the solid-state secondary battery 1.

The filler, the coating agent, the dispersant, and/or the ion conducting agent included in the first negative electrode active material layer(s) 24, 24a, and/or 24b may be any suitable materials that may be used in a negative electrode of a solid-state secondary battery. The filler, the coating agent, the dispersant, and/or the ion conducting agent contained in the first negative electrode active material layer(s) 24, 24a, and/or 24b may be in an amount of about 0.1 wt % to about 5 wt %, about 0.1 wt % to about 3 wt %, or about 0.1 wt % to about 1 wt %, respectively.

Negative Electrode: First Negative Electrode Active Material Layer

The first negative electrode active material layers 24, 24a, and 24b each independently have a thickness of, for example, about 1 μm to about 20 μm, about 1 μm to about 15 μm, about 2 μm to about 10 μm, or about 3 μm to about 7 μm. The thickness of the first negative electrode active material layers 24, 24a, and 24b is each independently, for example, 50% or less, 40% or less, 30% or less, 20% or less, 10% or less, or 5% or less of the thickness of a positive electrode active material layer. When the first negative electrode active material layer(s) 24, 24a, and/or 24b are too thin in thickness, lithium dendrites formed between the first negative electrode active material layer(s) 24, 24a, and/or 24b and the negative electrode current collector(s) 21, 21a, and/or 21b, respectively, may break down the first negative electrode active material layer(s) 24, 24a, and/or 24b to hinder the improvement of (or to hardly improve) the cycle characteristics of the solid-state secondary battery. When the first negative electrode active material layer(s) 24, 24a, and/or 24b are too thick in thickness, the energy density of the solid-state secondary battery employing the negative electrode 20 decreases and the internal resistance of the solid-state secondary battery due to the first negative electrode active material layer(s) 24, 24a, and/or 24b increases, and thus, the cycle characteristics of the solid-state secondary battery may hardly improve.

When the thickness of the first negative electrode active material layer(s) 24, 24a, and/or 24b decreases, for example, the first negative electrode active material layer(s) 24, 24a, and/or 24b have reduced charging capacity as well. The charging capacity of the first negative electrode active material layers 24, 24a, and 24b is each independently, for example, 50% or less, 40% or less, 30% or less, 20% or less, 10% or less, 5% or less, or 2% or less of the charging capacity of a positive electrode active material layer. The charging capacity of the first negative electrode active material layers 24, 24a, and 24b is each independently, for example, about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of a positive electrode active material layer. When the charging capacity of the first negative electrode active material layer(s) 24, 24a, and/or 24b is too small, the first negative electrode active material layer(s) 24, 24a, and/or 24b become too thin in thickness, and lithium dendrites formed between the first negative electrode active material layer(s) 24, 24a, and/or 24b and the negative electrode current collector(s) 21, 21a, and/or 21b, respectively, may cause a breakdown of the first negative electrode active material layer(s) 24, 24a, and/or 24b during charging/discharging, thus it is difficult to improve the cycle characteristics of the solid-state secondary battery. When the charging capacity of the first negative electrode active material layer(s) 24, 24a, and/or 24b is too large, the energy density of the solid-state secondary battery decreases and the internal resistance of the solid-state secondary battery due to the first negative electrode active material layer(s) 24, 24a, and/or 24b increases, and thus, it is difficult to improve the cycle characteristics of the solid-state secondary battery.

The charging capacity of a positive electrode active material layer is obtained by multiplying charging capacity density (mAh/g) of the positive electrode active material by weight of the positive electrode active material in the positive electrode active material layer. When different types (or kinds) of the positive electrode active materials are used, charging capacity density×weight values for each positive electrode active material are calculated, and the sum of the values is regarded as the charging capacity of the positive electrode active material layer. A charging capacity of the first negative electrode active material layers 24, 24a, and 24b is each independently also calculated in the same way. For example, the charging capacity of the first negative electrode active material layers 24, 24a, and 24b is each independently obtained by multiplying charging capacity density (mAh/g) of the negative electrode active material by weight of the negative electrode active material in the first negative electrode active material layers 24, 24a, and 24b, respectively. When different types (or kinds) of the negative electrode active materials are used, charging capacity density×mass values for each negative electrode active material are calculated, and the sum of the values is regarded as the charging capacity of the first negative electrode active material layers 24, 24a, and 24b, respectively. In this case, the charging capacity density of the positive electrode active material and the negative electrode active material refer to a capacity estimated by using a solid-state half-cell using lithium metal as a counter electrode. Based on the charging capacity measurement using the solid-state half-cell, the charging capacity of the positive electrode active material layer and the first negative electrode active material layers 24, 24a, and 24b is directly measured. When the charging capacity thus measured is divided by the weight of each active material, the charging capacity density is calculated. In one or more embodiments, the charging capacity of the positive electrode active material layer and the first negative electrode active material layers 24, 24a, and 24b may each independently be an initial charging capacity measured in a first cycle of charging.

Solid-State Secondary Battery

A solid-state secondary battery according to an embodiment includes a positive electrode, the above-described negative electrode, and a solid electrolyte layer disposed between the positive electrode and the negative electrode, wherein the solid electrolyte layer includes a sulfide-based solid electrolyte. When the first metal substrate of the negative electrode current collector included in the negative electrode is coated with a coating layer containing a second metal having high hardness, deterioration of the first metal substrate, for example, a Cu substrate, due to a sulfide-based solid electrolyte may be prevented or reduced. When the lithium-containing metal layer plated on the negative electrode current collector during charging/discharging has improved uniformity, micro-cracks of the solid electrolyte layer due to a non-uniform lithium-containing metal layer may be prevented or reduced. Therefore, the risk of a short circuit of the solid electrolyte layer is prevented or reduced during charging/discharging of the solid-state secondary battery. As a result, the solid-state secondary battery may have improved cycle characteristics.

Referring to FIGS. 3, 4A, 4B and 6, the solid-state secondary battery 1 includes a positive electrode 10, the above-described negative electrode 20, 20a, and/or 20b, and solid electrolyte layer(s) 30, 30a, and/or 30b disposed between the positive electrode 10 and the negative electrode(s) 20, 20a, and/or 20b, wherein the solid electrolyte layer(s) 30, 30a, and/or 30b contains a sulfide-based solid electrolyte.

Figure 3:
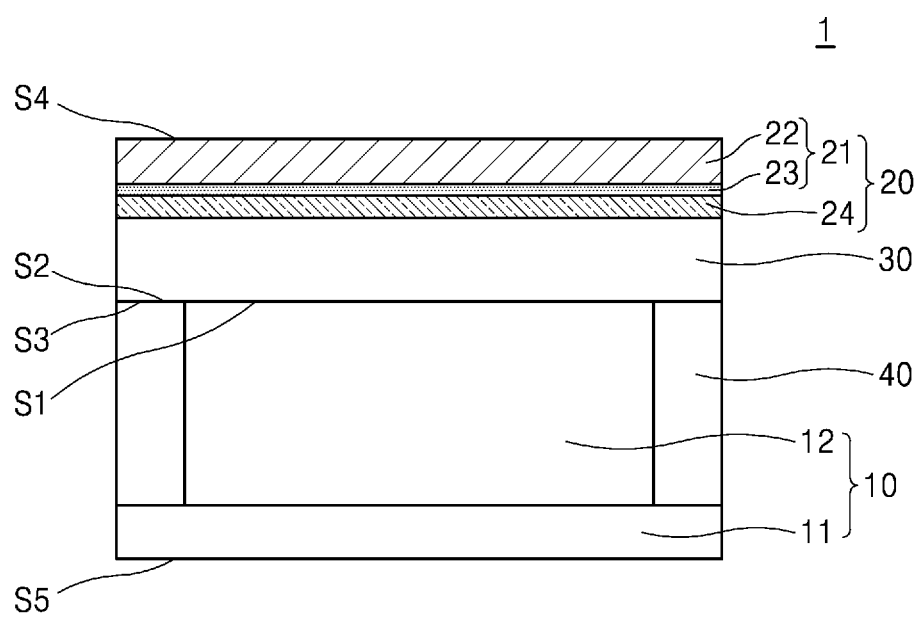
FIG. 3 is a cross-sectional view of a solid-state secondary battery according to one or more embodiments.

Referring to FIG. 3, the solid-state secondary battery 1 may have, for example, a single-cell structure having a positive electrode active material layer 12, a solid electrolyte layer 30, and a negative electrode 20 all disposed on one side of the positive electrode current collector 11.

Figure 4A:
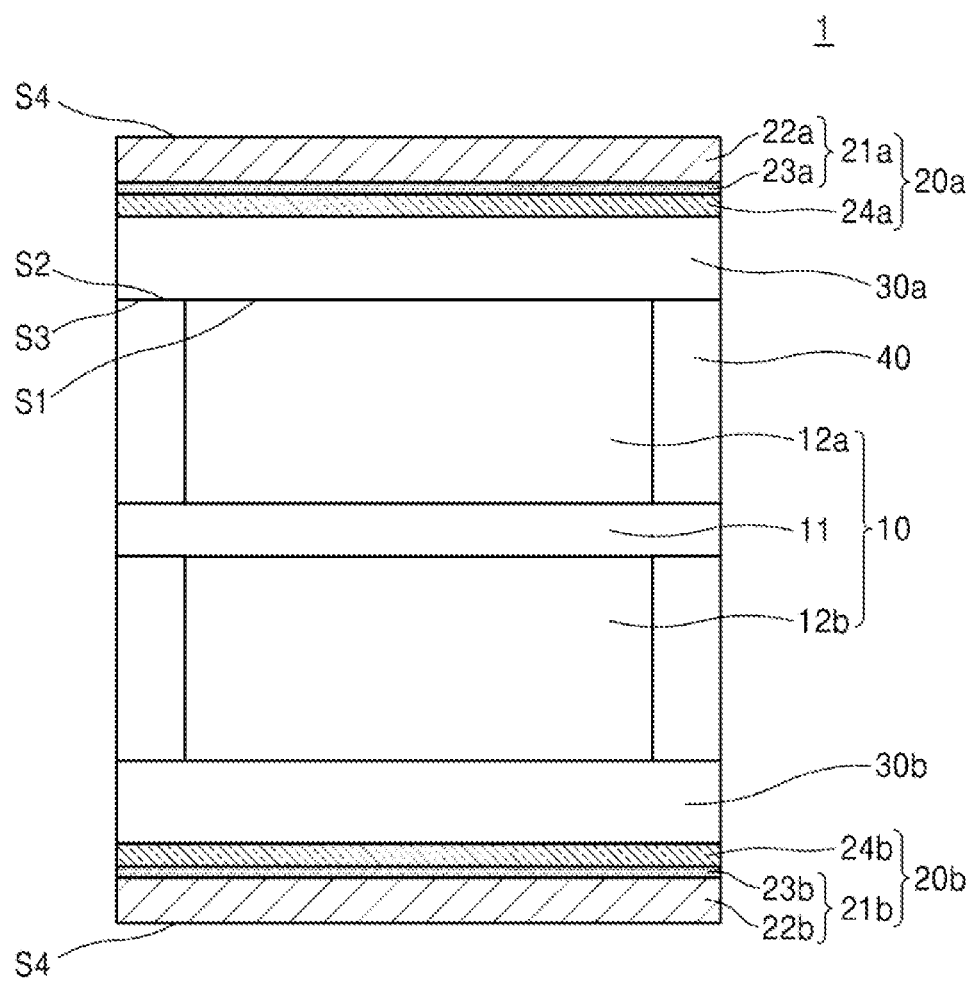
FIGS. 4A and 4B are a cross-sectional view of a bi-cell type solid-state secondary battery according to one or more embodiments.
Figure 4B:
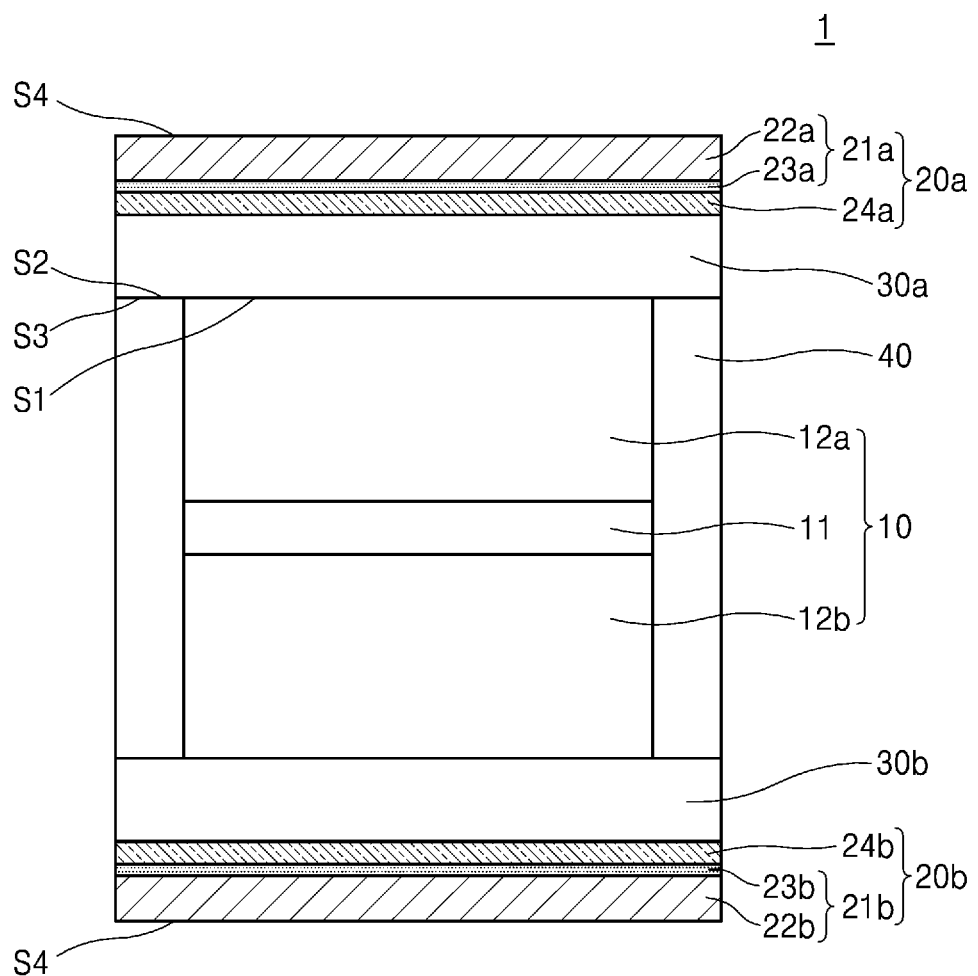
Figure 5:
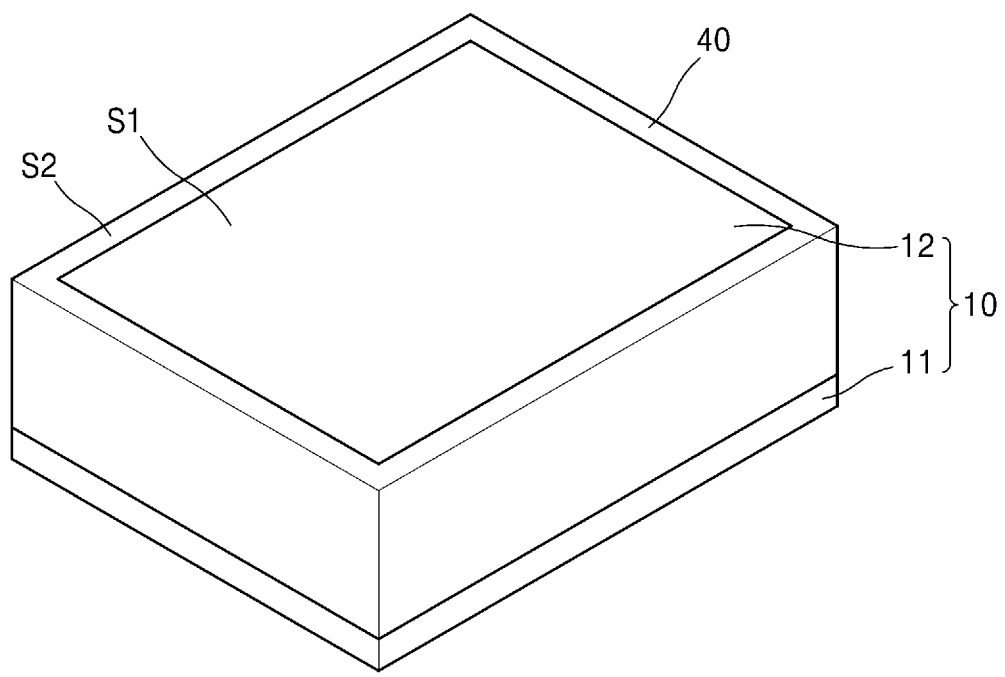
FIG. 5 is a schematic view of a positive electrode layer of a solid-state secondary battery according to one or more embodiments.
Figure 6:
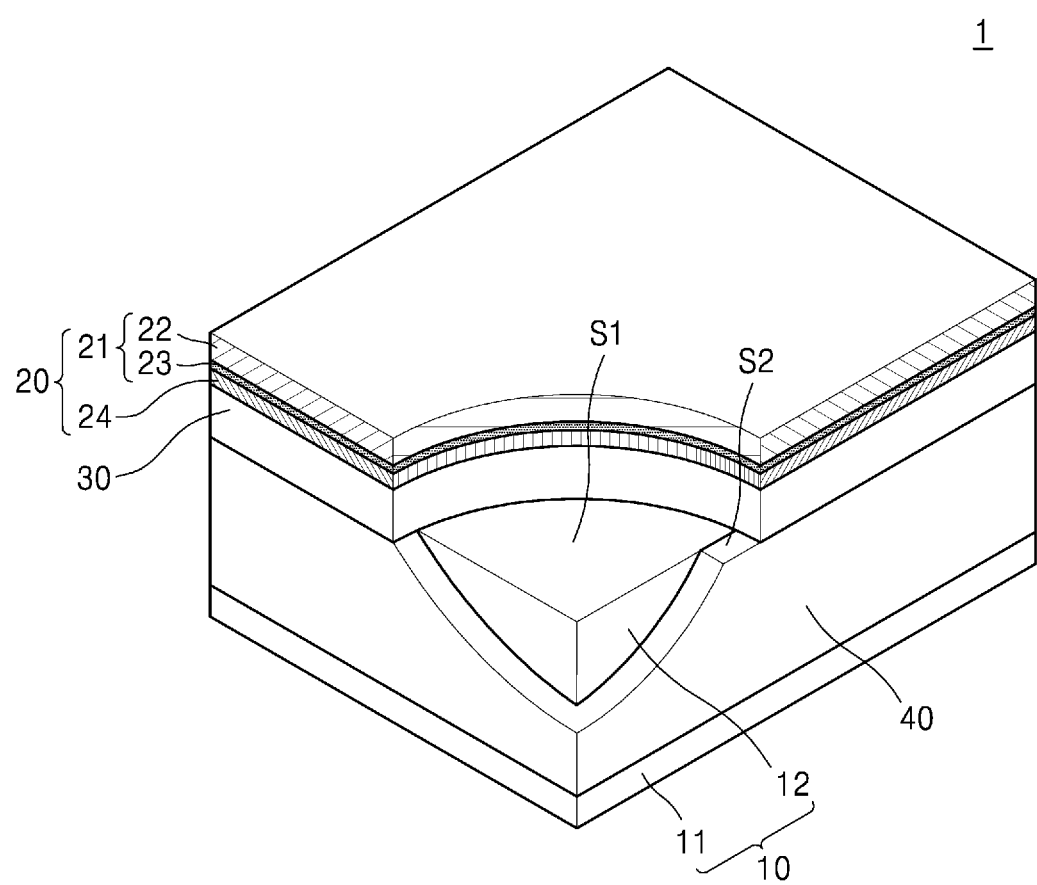
FIG. 6 is a schematic view partially showing the inside of a solid-state secondary battery according to one or more embodiments.

Referring to FIGS. 4A and 4B, the solid-state secondary battery 1 may have, for example, a bi-cell structure having a positive electrode active material layers 12a and 12b, solid electrolyte layers 30a and 30b, and negative electrodes 20a and 20b respectively disposed on both sides of the positive electrode current collector 11. In the solid-state secondary battery 1 having a bi-cell structure, pressure is symmetrically applied in both directions of the solid-state secondary battery 1 in the manufacturing of a battery, and cracks that may be caused when pressure is applied in one direction in the manufacturing of the solid-state secondary battery 1 may be more effectively prevented or reduced.

Positive Electrode

Positive Electrode: Positive Electrode Active Material

Referring to FIGS. 3 to 6, the positive electrode 10 includes positive electrode current collector 11, and positive electrode active material layer(s) 12, 12a, and/or 12b disposed on the positive electrode current collector. Each of the positive electrode active material layers 12, 12a, and 12b contains a positive electrode active material.

The positive electrode active material is a positive electrode active material capable of reversibly absorbing and desorbing lithium ions. The positive electrode active material may be, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganate (NCM), a lithium manganate, and/or a lithium iron phosphate; a nickel sulfide; a copper sulfide; a lithium sulfide; an iron oxide; and/or a vanadium oxide, but embodiments are not limited thereto, and any suitable material for a positive electrode active material may be used. Examples of the positive electrode active material may be used alone or in a mixture of at least two selected therefrom.

The lithium transition metal oxide may be, for example, a compound represented by any one of the following formulae: $Li_aA_{1-b}B_bD_2$ (where $0.90 \leq a \leq 1$ and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.10$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compound, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. A compound to which a coating layer is added to a surface of the compound may be used, and a mixture of the compound and a compound to which a coating layer is added may be used. The coating layer added to the surface of the compound includes, for example, coating element compounds such as an oxide of a coating element, a hydroxide, an oxyhydroxide of a coating element, an oxycarbonate of a coating element, and/or a hydroxycarbonate of a coating element. The compounds forming the coating layer may each independently be amorphous or crystalline. In one or more embodiments, the coating element included in the coating layer is Mg, Al, Co, K, Na, Ca, Si, Ti, V, Sn, Ge, Ga, B, As, Zr, or a mixture thereof. The coating layer is formed using any suitable method that does not adversely affect the physical properties of the positive electrode active material. For example, suitable coating methods include spray coating, dipping, etc. Specific coating methods may be well understood by one of ordinary skill in the art, and thus a detailed description thereof will not be provided.

The positive electrode active material may include, for example, a lithium salt of a transition metal oxide that has a layered rock salt type structure among the examples of the lithium transition metal oxide. For example, the "layered rock salt type structure" refers to a structure in which an oxygen atom layer and a metal atom layer are alternately and regularly arranged in a <111> direction in a cubic rock salt type structure, where each of the atom layers forms a two-dimensional flat plane. The "cubic rock salt type structure" refers to a sodium chloride (NaCl) type structure, which is one of the crystalline structures, in particular, to a structure in which face centered cubic (fcc) lattices respectively formed of anions and cations are shifted by only a half of the ridge of each unit lattice. Examples of the lithium transition metal oxide having the layered rock salt type structure may include a ternary lithium transition metal oxide expressed as $LiNi_xCo_yAl_zO_2$ (NCA) (where $0<x<1$, $0<y<1$, $0<z<1$, $x+y+z=1$), $LiNi_xCo_yMn_zO_2$ (NCM) (where $0<x<1$, $0<y<1$, $0<z<1$, and $x+y+z=1$), $LiNi_xCo_yAl_vMn_wO_2$ (NCAM) (where $0<x<1$, $0<y<1$, $0<v<1$, $0<w<1$, and $x+y+v+w=1$), $LiNi_aCo_bAl_cO_2$ ($0.5 \leq a<1$, $0<b<0.5$, $0<c<0.5$, $a+b+c=1$), $LiNi_aCo_bMn_cO_2$ (where $0.5 \leq a<1$, $0<b<0.5$, $0<c<0.5$, $a+b+c=1$), and/or $LiNi_aCo_bAl_dMn_eO_2$ ($0.5 \leq a<1$, $0<b<0.5$, $0<d<0.5$, $0<e<0.5$, $a+b+d+e=1$). When the positive electrode active material includes a ternary transition metal oxide having the layered rock salt type structure, an energy density and thermal stability of the solid-state secondary battery 1 may improve.

The positive electrode active material may be covered by a coating layer as described above. The coating layer may be any suitable material that may be used as a coating layer of a positive electrode active material of a solid-state secondary battery. The coating layer may be, for example, $Li_2O-ZrO_2$ (LZO), etc.

When the positive electrode active material includes nickel (Ni) as a ternary lithium transition metal oxide such as NCA, NCM and/or NCAM, a capacity density of the solid-state secondary battery 1 increases, and thus metal elution from the positive electrode active material in a charged state may be reduced. As a result, the solid-state secondary battery 1 may have improved cycle characteristics in a charged state.

A shape of the positive electrode active material may be, for example, particle shapes such as a true spherical shape, an elliptical shape, or a spherical shape. A particle diameter of the positive electrode active material is not particularly limited but may be in any suitable range applicable to a positive electrode active material of a solid-state secondary battery. An amount of the positive electrode active material of the positive electrode layer 10 is not particularly limited and may be in any suitable range applicable to a positive electrode layer of a solid-state secondary battery.

The positive electrode active material included in the positive electrode active material layers 12, 12a, and 12b may be contained in an amount of about 80 wt % to about 99 wt %, about 80 wt % to about 95 wt %, or about 80 wt % to about 90 wt % of a total weight of the positive electrode active material layers 12, 12a, and 12b, respectively.

Positive Electrode: Solid Electrolyte

The positive electrode active material layer(s) 12, 12a, and/or 12b may further include a solid electrolyte, in addition to the positive electrode active material. The solid electrolyte included in the positive electrode 10 may be the same as or different from the solid electrolyte included in the solid electrolyte layer(s) 30, 30a, and/or 30b. The solid electrolyte layers 30, 30a, and 30b may be referred to for details on the solid electrolyte included in the positive electrode 10.

The solid electrolyte used in the positive electrode active material layer(s) 12, 12a, and/or 12b may have a smaller D50 average particle diameter than the solid electrolyte used in the solid electrolyte layer(s) 30, 30a, and/or 30b. For example, the D50 average particle diameter of the solid electrolyte used in the positive electrode active material layers 12, 12a, and 12b may each independently be 90% or less, 80% or less, 70% or less, 60% or less, 50% or less, 40% or less, 30% or less, or 20% or less of the D50 average particle diameter of the solid electrolyte used in the solid electrolyte layer(s) 30, 30a, and/or 30b. The solid electrolyte used in the positive electrode active material layers 12, 12a, and 12b may each independently have a D50 average particle diameter of, for example, about 0.1 μm to about 2 μm, about 0.2 μm to about 1.5 μm, or about 0.3 μm to about 1.0 μm.

The solid electrolyte included in the positive electrode active material layers 12, 12a, and 12b may each independently be contained in an amount of about 1 wt % to about 20 wt %, about 5 wt % to about 20 wt %, about 10 wt % to about 20 wt %, about 1 wt % to about 15 wt %, about 5 wt % to about 15 wt %, or about 8.0 wt % to about 12.0 wt % of a total weight of the positive electrode active material layers 12, 12a, and 12b, respectively.

Positive Electrode: Binder

The positive electrode active material layers 12, 12a, and 12b may each independently include a binder. Examples of the binder may include styrene-butadiene rubber (SBR), polytetrafluoroethylene, polyvinylidene fluoride, polyethylene, but embodiments are not limited thereto, and any suitable binder may be used.

The binder included in the positive electrode active material layers 12, 12a, and 12b may each independently be contained, for example, in an amount of about 0.1 wt % to about 5 wt %, about 0.5 wt % to about 3 wt %, or about 1.0 wt % to about 2.0 wt % of a total weight of the positive electrode active material layers 12, 12a, and 12b, respectively.

Positive Electrode: Conducting Agent

The positive electrode active material layers 12, 12a, and 12b may each independently include a conducting agent. The conducting agent may be, for example, a carbon-based conducting agent and/or a metallic conducting agent. Examples of the conducting agent may include graphite, carbon black, acetylene black, ketjen black, carbon fibers, carbon tubes, metal powder, etc., but are not necessarily limited to thereto, and any suitable material for a conducting agent may be used.

The conducting agent included in the positive electrode active material layers 12, 12a, and 12b may each independently be contained, for example, in an amount of about 0.1 wt % to about 10 wt %, about 0.5 wt % to about 5 wt %, or about 1.0 wt % to about 4.0 wt % of a total weight of the positive electrode active material layers 12, 12a, and 12b, respectively.

Positive Electrode: Other Additives

The positive electrode active material layers 12, 12a, and 12b may each independently further include one or more additives such as a filler, a coating agent, a dispersant, and/or an ion conducting agent, in addition to the positive electrode active material, solid electrolyte, binder, and/or conducting agent.

The filler, the coating agent, the dispersant, and/or the ion conducting agent that may be included in the positive electrode active material layers 12, 12a, and 12b may each independently be any suitable materials for a positive electrode of a solid-state secondary battery. The filler, the coating agent, the dispersant, and/or the ion conducting agent contained in the first positive electrode active material layer(s) 12, 12a, and/or 12b may each independently be in an amount of about 0.1 wt % to about 5 wt %, about 0.1 wt % to about 3 wt %, or about 0.1 wt % to about 1 wt %.

Positive Electrode: Positive Electrode Current Collector

The positive electrode current collector 11 may be, for example, a plate and/or a foil that is formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In some embodiments, the positive electrode current collector 11 may be omitted.

The positive electrode current collector 11 may further include a carbon layer disposed on one or both surfaces of a metal substrate. The additional placement of the carbon layer on the metal substrate may prevent or reduce corrosion of a metal of the metal substrate due to a solid electrolyte included in the positive electrode layer, and may reduce the interfacial resistance between the positive electrode active material layer(s) 12, 12a, and/or 12b and the positive electrode current collector 11. The carbon layer may have a thickness of, for example, about 0.1 µm to about 5 µm, about 0.5 µm to about 5 µm, about 1 µm to about 5 µm, about 1 µm to about 4 µm, or about 1 µm to about 3 µm. When the carbon layer is too thin in thickness, it may be hard to completely block (or substantially reduce) contact between the metal substrate and the solid electrolyte. When the carbon layer is too thick in thickness, the solid-state secondary battery may have a reduced energy density. The carbon layer may contain amorphous carbon, crystalline carbon, etc.

The positive electrode current collector 11 including the metal substrate, and optionally including the carbon layer, may have a thickness of, for example, about 10 µm to about 50 µm, about 10 µm to about 40 µm, or about 10 µm to about 30 µm, but the thickness is not necessarily limited thereto, and may be selected according to the required (or desired) characteristics of the solid-state secondary battery.

Positive Electrode: Inactive Member

Referring to FIGS. 3 to 6, the positive electrode 10 may include positive electrode current collector 11, positive electrode active material layers 12, 12a, and 12b disposed on the positive electrode current collector, and further include an inactive member 40 disposed on at least one side (e.g., left and right sides) of the positive electrode active material layer.

As used herein, the inactive member 40 is a member that does not contain an electrochemically active material, for example, an electrode active material. The electrode active material is a material capable of absorbing/desorbing lithium. The inactive member is a material other than the electrode active material, and is formed of any suitable material in the art.

The inactive member 40 may surround or be around side surfaces of the positive electrode active material layer(s) 12, 12a, and/or 12b and contact the solid electrolyte layer(s) 30, 30a, and/or 30b. When the inactive member 40 surrounds side surfaces of the positive electrode active material layer(s) 12, 12a, and/or 12b and contacts the solid electrolyte layer(s) 30, 30a, and/or 30b, cracks in the solid electrolyte layer(s) 30, 30a, and/or 30b that may be caused by a pressure difference during pressing in the solid electrolyte layer(s) 30, 30a, and/or 30b which are not in contact with the positive electrode active material layer(s) 12, 12a, and/or 12b may be prevented or reduced.

The inactive member 40 may extend to ends of the solid electrolyte layer(s) 30, 30a, and/or 30b. When the inactive member 40 extends to the ends of the solid electrolyte layer(s) 30, 30a, and/or 30b, cracks at the ends of the solid electrolyte layer(s) 30, 30a, and/or 30b may be prevented or reduced. The ends of the solid electrolyte layers 30, 30a, and 30b are outermost portions thereof in contact with the side surfaces of the solid electrolyte layers 30, 30a, and 30b, respectively. For example, the inactive member 40 may extend to the outermost portions of the solid electrolyte layer(s) 30, 30a, and/or 30b in contact with the side surfaces of the solid electrolyte layer(s) 30, 30a, and/or 30b, respectively.

An area (e.g., surface area) S1 of the positive electrode active material layers 12, 12a, and 12b is smaller than an area (e.g., surface area) S2 of the solid electrolyte layers 30, 30a, and 30b in contact with the positive electrode active material layers 12, 12a, and 12b, and the inactive member 40 is disposed surrounding the side surfaces of the positive electrode active material layers 12, 12a, and 12b to correct a difference in area (e.g., length in one direction) between the respective surfaces the positive electrode active material layers 12, 12a, and 12b and the solid electrolyte layers 30, 30a, and 30b. When an area (e.g., surface area) S3 of the inactive member 40 corrects the difference in area (e.g., length in one direction) between the area (e.g., surface area) S1 of the positive electrode active material layers 12, 12a, and 12b and the area (e.g., surface area) S2 of the solid electrolyte layers 30, 30a, and 30b, cracks in the solid electrolyte layers 30, 30a, and 30b due to the pressure difference during pressing may be prevented or reduced. For example, the area (e.g., surface area) S1 of the positive electrode active material layers 12, 12a, and 12b may each independently be less than 100%, 99% or less, 98% or less, 97% or less, 96% or less, 85% or less, or 93% or less of the area (e.g., surface area) S2 of the solid electrolyte layers 30, 30a, and 30b. For example, the area (e.g., surface area) S1 of the positive electrode active material layers 12, 12a, and 12b may each independently be about 50% to about less than 100%, about 50% to about 99%, about 55% to about 98%, about 60% to about 97%, about 70% to about 96%, about 80% to about 95%, or about 85% to about 95% of the area (e.g., surface area) S2 of the solid electrolyte layers 30, 30a, and 30b. When the area (e.g., surface area) S1 of the positive electrode active material layer(s) 12, 12a, and/or 12b is equal to or greater than the area (e.g., surface area) S2 of the solid electrolyte layer(s) 30, 30a, and/or 30b, respectively, a short circuit may be caused due to physical contact between the positive electrode active material layer(s) 12, 12a, and/or 12b and the negative electrode active material layer(s) 22, 22a, and/or 22b, respectively, or the chance of a short circuit being caused may increase due to overcharging of lithium.

The area (e.g., surface area) S3 of the inactive member 40 may be 50% or less, 40% or less, 30% or less, 20% or less, or 10% or less of the area (e.g., surface area) S1 of the positive electrode active material layers 12, 12a, and 12b. For example, the area (e.g., surface area) S3 of the inactive member 40 may be about 1% to about 50%, about 5% to about 40%, about 5% to about 30%, about 5% to about 20%, or about 5% to about 15% of the area (e.g., surface area) S1 of the positive electrode active material layers 12, 12a, and 12b. The sum of the area (e.g., surface area) S3 of the inactive member 40 and the area (e.g., surface area) S1 of the positive electrode active material layers 12, 12a, and 12b, respectively, may be the same as the area (e.g., surface area) S2 of the solid electrolyte layers 30, 30a, and 30b, respectively.

The inactive member 40 may be disposed between the positive electrode current collector 11 and the solid electrolyte layers 30, 30a, and 30b which face each other, or disposed between two solid electrolyte layers 30, 30a, and 30b facing each other. The inactive member 40 may serve as a filler that fills a space between the positive electrode current collector 11 and the solid electrolyte layers 30, 30a, and 30b facing each other, or a space between the two solid electrolyte layers 30, 30a, and 30b facing each other.

The area (e.g., surface area) S1 of the positive electrode active material layers 12, 12a, and 12b may each independently be smaller than an area (e.g., surface area) S4 of the negative electrode current collectors 21, 21a, and 21b, respectively. For example, the area (e.g., surface area) S1 of the positive electrode active material layers 12, 12a, and 12b may each independently be less than 100%, 99% or less, 98% or less, 97% or less, 96% or less, 85% or less, or 93% or less of the area (e.g., surface area) S4 of the negative electrode current collectors 21, 21a, and 21b, respectively. For example, the area (e.g., surface area) S1 of the positive electrode active material layers 12, 12a, and 12b may each independently be about 50% to about less than 100%, about 50% to about 99%, about 55% to about 98%, about 60% to about 97%, about 70% to about 96%, about 80% to about 95%, or about 85% to about 95% of the area (e.g., surface area) S4 of the negative electrode current collectors 21, 21a, and 21b, respectively.

The area (e.g., surface area) S4 of the negative electrode current collectors 21, 21a, and 21b may each independently be the same as an area (e.g., surface area) S5 and/or a shape of the positive electrode current collector 11. For example, the area (e.g., surface area) S4 of the negative electrode current collectors 21, 21a, and 21b may each independently be in the range of 100±1% or 100±0.5% of the area (e.g., surface area) S5 of the positive electrode current collector 11. The area (e.g., surface area) S5 of the positive electrode current collector 11 may each independently be the same as the area (e.g., surface area) S2 and/or a shape of the solid electrolyte layers 30, 30a, and 30b, respectively. For example, the area (e.g., surface area) S5 of the positive electrode current collector 11 may each independently be in the range of 100±1% or 100±0.5% of the area (e.g., surface area) S2 of the solid electrolyte layers 30, 30a, and 30b, respectively. In the present specification, the "same" area and/or shape includes all cases having the "substantially the same" area and/or shape, except for a case in which an area and/or shape is intended to be different.

The inactive member 40 may include at least one selected from a lithium ion insulator or a lithium ion conductor. The inactive member 40 may be an electronic insulator. For example, the inactive member 40 may not be an electronic conductor.

The inactive member 40 may be an organic material, an inorganic material, or an organic-inorganic composite material. The organic material may be, for example, a polymer. The inorganic material may be, for example, ceramic such as a metal oxide. The organic-inorganic composite material may be a composite of a polymer and a metal oxide. The inactive member 40 may include, for example, at least one selected from an insulating polymer, an ion conductive polymer, an insulating inorganic material, an oxide-based solid electrolyte, and a sulfide-based solid electrolyte. The inactive member 40 may be, for example, an olefin-based polymer such as polypropylene (PP) and/or polyethylene (PE).

The density of the inactive member 40 may be, for example, about 10% to about 200%, about 10% to about 150%, about 10% to about 140%, about 10% to about 130%, or about 10% to about 120% of the density of the positive electrode active material included in the positive electrode active material layer(s) 12, 12a, and/or 12b. The density of the inactive member 40 may be, for example, about 90% to about 110% of the density of the positive electrode active material included in the positive electrode active material layer(s) 12, 12a, and/or 12b. The density of the inactive member 40 may be, for example, substantially the same as the density of the positive electrode active material included in the positive electrode active material layer(s) 12, 12a, and/or 12b.

The inactive member 40 may be, for example, a gasket. When the gasket is used as the inactive member 40, cracks in the solid electrolyte layer(s) 30, 30a, and/or 30b due to a pressure difference during pressing may be prevented or reduced.

The thickness of the inactive member 40 may be the same as or similar to the thickness of the positive electrode active material layer(s) 12, 12a, and/or 12b.

Solid Electrolyte Layer

Solid Electrolyte Layer: Solid Electrolyte

Referring to FIGS. 3 to 6, the solid electrolyte layers 30, 30a, and 30b are disposed between the positive electrode 10 and the negative electrode 20, 20a, and 20b, respectively, and include a sulfide-based solid electrolyte.

The sulfide-based solid electrolyte may include, for example, at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is one of Ge, Zn or Ga), $Li_2S$—$GeS_2$, $Li_2S$—$SiS_2$—$Li_3PO_4$, $Li_2S$—$SiS_2$—$Li_pMO_q$ (where p and q are positive numbers, and M is one of P, Si, Ge, B, Al, Ga, or In), $Li_{2-x}PS_{6-x}Cl_x$ (where 0≤x≤2), $Li_{2-x}PS_{6-x}Br_x$, (where 0≤x≤2), and $Li_{2-x}PS_{6-x}I_x$ (where 0≤x≤2). For example, the sulfide-based solid electrolyte material may be prepared by treating starting materials (e.g., $Li_2S$ and/or $P_2S_5$) using a melt-quenching method and/or a mechanical milling method. Subsequently, the resultant may be heat-treated. The sulfide-based solid electrolyte may be amorphous, crystalline, or a mixed form thereof. In one or more embodiments, the solid electrolyte may include sulfur(S), phosphorus (P), and/or lithium (Li), as at least one or more component elements of the sulfide-based solid electrolyte material described above. For example, the solid electrolyte may be a material including $Li_2S$—$P_2S_5$. When $Li_2S$—$P_2S_5$ is used as a sulfide-based solid electrolyte material that forms the solid electrolyte, a mixing molar ratio of $Li_2S$ and $P_2S_5$ ($Li_2S$:$P_2S_5$) may be, for example, in a range of about 50:50 to about 90:10.

The sulfide-based solid electrolyte may include, for example, an argyrodite type (or kind) solid electrolyte represented by Formula 1 below:

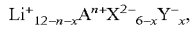

$$Li^+{}_{12-n-x}A^{n+}X^{2-}{}_{6-x}Y^-{}_x,$$   Formula 1 wherein in Formula 1 above, A is P, As, Ge, Ga, Sb, Si, Sn, Al, In, Ti, V, Nb or Ta; X is S, Se or Te; Y is Cl, Br, I, F, CN, OCN, SCN, or N3; and 1<n<5 and 0<x<2 are satisfied. The sulfide-based solid electrolyte may be, for example, an argyrodite-type compound (e.g., an argyrodite compound) including at least one selected from $Li_{7-x}PS_{6-x}Cl_x$ (where 0≤x≤2), $Li_{2-x}PS_{6-x}Br_x$ (where 0≤x≤2), and $Li_{2-x}PS_{6-x}I_x$ (where 0≤x≤2). The sulfide solid electrolyte may be, for example, an argyrodite-type compound (e.g., an argyrodite compound) that includes at least one selected from $Li_6PS_5Cl$, $Li_6PS_5Br$, and $Li_6PS_5I$.

The argyrodite-type solid electrolyte (e.g., the argyrodite solid electrolyte) may have a density of about 1.5 g/cc to about 2.0 g/cc. When the argyrodite-type solid electrolyte (e.g., the argyrodite solid electrolyte) has a density of at least 1.5 g/cc, the internal resistant of the solid-state secondary battery may decrease, and penetration of a solid electrolyte layer by lithium may be prevented or reduced.

The elastic modulus, that is, the Young's modulus, of the sulfide-based solid electrolyte may be, for example, about 35 GPa or less, about 30 GPa or less, about 27 GPa or less, about 25 GPa or less, or about 23 GPa or less. The elastic modulus, that is, the Young's modulus, of the sulfide-based solid electrolyte may be, for example, about 10 GPa to about 35 GPa, about 10 GPa to about 30 GPa, about 10 GPa to about 27 GPa, about 10 GPa to about 25 GPa, or about 10 GPa to about 23 GPa. When the sulfide-based solid electrolyte has an elastic modulus in these ranges, temperatures and/or pressures required for sintering, etc. may decrease, and thus, the sintering of the solid electrolyte may be more easily performed.

The solid electrolyte used in the solid electrolyte layers 30, 30a, and/or 30b may have a D50 average particle diameter of, for example, about 1 μm to about 10 μm, about 1.5 μm to about 7 μm, or about 2 μm to about 5 μm.

The sulfide-based solid electrolyte included in the solid electrolyte layers 30, 30a, and 30b may each independently be contained, for example, in an amount of about 97 wt % to about 100 wt %, about 98 wt % to about 99.9 wt %, or about 98.5 wt % to about 99.0 wt % of a total weight of the solid electrolyte layers 30, 30a, and 30b, respectively.

Solid Electrolyte Layer: Binder

The solid electrolyte layer(s) 30, 30a, and 30b may each independently further include, for example, a binder. Examples of the binder included in the solid electrolyte layer(s) 30, 30a, and/or 30b may be styrene butadiene rubber (SBR), polytetrafluoroethylene, polyvinylidene fluoride, and/or polyethylene, but embodiments are not limited thereto, and any suitable binder material may be used. The binder of the solid electrolyte layers 30, 30a, and 30b may each independently be the same as or different from a binder included in the positive electrode active material layers 12, 12a, and 12b and the negative electrode active material layer 22.

The binder included in the solid electrolyte layers 30, 30a, and 30b may each independently be contained, for example, in an amount of about 0.1 wt % to about 3 wt %, about 0.5 wt % to about 2 wt %, or about 1.0 wt % to about 2.0 wt % of a total weight of the solid electrolyte layers 30, 30a, and 30b, respectively.

Negative Electrode: Second Negative Electrode Active Material Layer (Plated Layer or Non-Plated Layer)

Referring to FIGS. 3, 4A, 4B and 6, the solid-state secondary battery 1 includes a positive electrode 10, the above-described negative electrode(s) 20, 20a, and/or 20b, and solid electrolyte layer(s) 30, 30a, and/or 30b disposed between the positive electrode 10 and the negative electrode(s) 20, 20a, and/or 20b, respectively.

The solid-state secondary battery 1 may further include, for example, a second negative electrode active material layer disposed between the negative electrode current collectors 21, 21a, and 21b and the first negative electrode active material layers 24, 24a, and 24b, respectively, by charging. In one or more embodiments, the solid-state secondary battery 1 may further include, for example, a second negative electrode active material layer disposed between the solid electrolyte layers 30, 30a, and 30b and the first negative electrode active material layers 24, 24a, and 24b, respectively, by charging. The second negative electrode active material layer may be a metal layer containing lithium and/or a lithium alloy. For example, the metal layer contains lithium or a lithium alloy. Therefore, as a metal layer containing lithium, the second negative electrode active material layer serves as, for example, a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, and/or a Li—Si alloy, but embodiments are not limited thereto, and any suitable lithium alloy may be used. The second negative electrode active material layer may be composed of lithium or one of the alloys of lithium, or may be composed of various alloys.

The thickness of the second negative electrode active material layer is not particularly limited, but may be, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the second negative electrode active material layer is too thin in thickness, it is hard for the second negative electrode active material layer to serve as a lithium reservoir. When the second negative electrode active material layer is too thick in thickness, the solid-state secondary battery 1 may have a greater mass and volume and have rather deteriorated (e.g., decreased) cycle characteristics.

In the solid-state secondary battery 1, the second negative electrode active material layer, for example, may be plated between the negative electrode current collector(s) 21, 21a, and/or 21b, and the first negative electrode active material layer(s) 24, 24a, and/or 24b, respectively, by charging after the solid-state secondary battery 1 is assembled. When the second negative electrode active material layer is plated by charging after assembling the solid-state secondary battery 1, the solid-state secondary battery 1 does not include the second negative electrode active material layer when the solid-state secondary battery is assembled, and thus energy density of the solid-state secondary battery 1 increases. For example, when charging the solid-state secondary battery 1, the solid-state secondary battery 1 is charged by exceeding the charging capacity of the first negative electrode active material layers 24, 24a, and 24b. That is, the first negative electrode active material layers 24, 24a, and 24b are overcharged. At the beginning of charging, lithium is absorbed into the first negative electrode active material layers 24, 24a, and 24b. The negative electrode active material included in the first negative electrode active material layers 24, 24a, and 24b forms an alloy or a compound with lithium ions transferred from the positive electrode layer 10. When the first negative electrode active material layers 24, 24a, and 24b are overcharged, for example, lithium is plated between the rear surfaces of the first negative electrode active material layers 24, 24a, and 24b, that is, between the negative electrode current collectors 21, 21a, and 21b and the first negative electrode active material layers 24, 24a, and 24b, respectively, and the plated lithium allows a metal layer corresponding to the second negative electrode active material layer to be formed. The second negative electrode active material layer is a metal layer mainly or substantially composed of lithium (e.g., metallic lithium). The results are obtained, for example, when the negative electrode active material included in the first negative electrode active material layers 24, 24a, and 24b is composed of a material that forms an alloy or a compound with lithium. When being discharged, lithium in the first negative electrode active material layer 24, 24a, and 24b and the second negative electrode active material layer, that is, the metal layer, is ionized (i.e., dissolved) and moves towards the positive electrode layer 10. Accordingly, lithium may be used as a negative electrode active material in the solid-state secondary battery 1. In one or more embodiments, because the first negative electrode active material layers 24, 24a, and 24b cover the second negative electrode active material layer, the first negative electrode active material layers 24, 24a, and 24b serve as a protective layer for the second negative electrode active material layer, for example, the metal layer, and serve to prevent or reduce the precipitation growth of lithium dendrite as well. Therefore, a short circuit and capacity deterioration of the solid-state secondary battery 1 are prevented or reduced, and as a result, the cycle characteristics of the solid-state secondary battery 1 improve. In addition, when the second negative electrode active material layer is disposed by charging after assembling the solid-state secondary battery, the negative electrode current collectors 21, 21a, and 21b and the first negative electrode active material layers 24, 24a, and 24b, and an area between them are, for example, lithium-free areas without including lithium at an initial state of the solid-state secondary battery or after discharging the solid-state secondary battery.

In one or more embodiments, in the solid-state secondary battery 1, the second negative electrode active material layer may be disposed between the negative electrode current collector(s) 21, 21a, and/or 21b and the first negative electrode active material layer(s) 24, 24a, and/or 24b, respectively, before assembling the solid-state secondary battery, or may be disposed between the solid electrolyte layer(s) 30, 30a, and/or 30b and the first negative electrode active material layer(s) 24, 24a, and/or 24b, respectively. For example, as a non-precipitating layer, the second negative electrode active material layer may be disposed between the negative electrode current collector(s) 21, 21a, and/or 21b and the first negative electrode active material layer(s) 24, 24a, and/or 24b, respectively, before assembling the battery, or may be disposed between the solid electrolyte layer(s) 30, 30a, and/or 30b and the first negative electrode active material layer(s) 24, 24a, and/or 24b, respectively. When the second negative electrode active material layer is disposed as a lithium reservoir before assembling the solid-state secondary battery 1, the loss of lithium caused by side reactions due to the charging/discharging of the solid-state secondary battery 1 may be compensated (or substantially compensated). The second negative electrode active material layer may be, for example, a lithium coating layer and/or a lithium metal foil having a thickness in the above-described ranges. The lithium metal coating layer may be coated through sputtering, etc.

The present disclosure will be described in more detail through Examples and Comparative Examples below. However, Examples are for illustrative purposes only and are not intended to limit the scope of the present disclosure.

Example 1: Cu Substrate/Ti Coating Layer Having a Thickness of 100 nm, First Active Material Layer (Metal-Carbon Layer) Having a Thickness of 7 μm Preparation of Negative Electrode As a first metal substrate, a Cu foil having a thickness of 10 μm was prepared. A coating layer in the form of a Ti thin film having a thickness of 100 nm was coated through DC magnetron sputtering on the Cu foil to prepare a negative electrode current collector. Cu has a Mohs hardness of 3.0, and Ti has a Mohs hardness of 6.0.

DC magnetron sputtering conditions were 125 W of cathode power, 1.1 Pa of sputtering pressure, and $4 \times 10^{-4}$ Pa of vacuum.

As a negative electrode active material, carbon black (CB) having a primary particle diameter of about 30 nm, and silver (Ag) particles having an average particle diameter of about 60 nm were prepared.

An NMP solvent and a PVDF-HFP binder (#9300 manufactured by Kureha Corporation, Mw: 1,200,000 g/mol) were added to a container and stirred at 1300 rpm for 5 minutes using a THINKY mixer to prepare an NMP solution containing the PVDF-HFP binder. Silver (Ag) particles and carbon black (CB) were sequentially added to the NMP solution and stirred for 5 minutes at 1300 rpm using a THINKY mixer to prepare a slurry. Carbon black (CB) and silver (Ag) particles had a weight ratio of 3:1, and the PVDF-HFP binder was contained in an amount of 6 wt % with respect to a solid content of the slurry.

The prepared slurry was applied onto the Ti coating layer of the negative electrode current collector using a bar coater, and dried in a convection oven at 80° C. for 10 minutes to obtain a laminate. Subsequently, the obtained laminate was vacuum-dried at 40° C. for 10 hours to obtain a vacuum-dried laminate. The vacuum-dried laminate was roll pressed for 10 ms at a pressure of 300 MPa to planarize a surface of the first negative electrode active material layer of the laminate. A negative electrode was prepared through the process above. The thickness of the first negative electrode active material layer included in the negative electrode was about 7 μm.

Preparation of Positive Electrode $Li_2O$—$ZrO_2$ (LZO)-coated $LiNi_{0.8}Co_{0.15}Mn_{0.05}O_2$ (NCM) was prepared as a positive electrode active material. The LZO-coated positive electrode active material was prepared according to the method disclosed in Korean Patent Laid-Open Publication No. 10-2016-0064942, the entire content of which is incorporated herein by reference. As a solid electrolyte, an argyrodite-type crystal (e.g., an argyrodite crystal), $Li_6PS_5Cl$ (D50=0.5 μm, crystalline) was prepared. As a binder, a polytetrafluoroethylene (PTFE) binder (Teflon binder manufactured by DuPont) was prepared. As a conducting agent, carbon nanofiber (CNF) was prepared. A mixture of these materials and a p-xylene solvent in a weight ratio of positive electrode active material:solid electrolyte:conducting agent:binder=84:11.5:3:1.5 was formed in the form of a sheet, and then the resultant was vacuum-dried at 40° C. for 10 hours to prepare a positive electrode sheet. A gasket made of polypropylene (PP) that surrounds the positive electrode sheet was arranged around the positive electrode sheet. The positive electrode sheet surrounded by the gasket was pressed onto one side of a positive electrode current collector formed of an 18 μm-thick carbon coated aluminum foil to prepare a positive electrode. The positive electrode sheet and the gasket were roll pressed for 100 ms at a pressure of 450 MPa.

The thickness of the positive electrode active material layer and the gasket included in the positive electrode was about 100 μm.

The positive electrode active material layer was disposed at the center of the positive electrode current collector, and the gasket surrounded the positive electrode active material layer and was disposed at an end (e.g., edge) of the positive electrode current collector. An area of the positive electrode active material layer was about 90% of an area of the positive electrode current collector, and the gasket was disposed surrounding the positive electrode active material layer over an entire area of the remaining 10% of the positive electrode current collector in which the positive electrode active material layer was not disposed.

Preparation of Solid Electrolyte Layer 1.5 parts by weight of an acrylic binder with respect to 98.5 parts by weight of a solid electrolyte was added to a $Li_6PS_5Cl$ solid electrolyte (D50=3.0 μm, crystalline), which is an argyrodite-type crystal (e.g., an argyrodite crystal) to prepare a mixture. Octyl acetate was added to the prepared mixture and stirred to prepare a slurry. The prepared slurry was applied onto a nonwoven fabric using a bar coater, and dried in air at 80° C. for 10 minutes to obtain a sheet-shaped solid. The obtained solid was vacuum-dried at 40° C. for 10 hours. A solid electrolyte layer was prepared through the process above.

Preparation of Solid-State Secondary Battery

A solid electrolyte layer was arranged on a positive electrode active material layer of a positive electrode, and a negative electrode was arranged on the solid electrolyte layer, such that a first negative electrode active material layer contacted the solid electrolyte layer to prepare a laminate.

The laminate was placed in a pouch and vacuum-sealed, and then was subjected to warm istactic press (WIP) at 90° C. for 30 minutes at a pressure of 500 MPa to prepare a solid-state secondary battery.

Through the pressure treatment, the solid electrolyte layer was sintered and thus, battery characteristics improved. The thickness of the sintered solid electrolyte layer was 60 μm.

Example 2: Cu Substrate/Ti Coating Layer Having a Thickness of 200 nm, First Active Material Layer (Metal-Carbon Layer) Having a Thickness of 7 μm A negative electrode and a solid-state secondary battery were prepared in substantially the same manner as in Example 1, except that the thickness of the coating layer in the form of a Ti thin film disposed on the Cu foil was changed to 200 nm.

Example 3: Cu Substrate/Ti Coating Layer Having a Thickness of 300 nm, First Active Material Layer (Metal-Carbon Layer) Having a Thickness of 7 μm A negative electrode and a solid-state secondary battery were prepared in substantially the same manner as in Example 1, except that the thickness of the coating layer in the form of a Ti thin film disposed on the Cu foil was changed to 300 nm.

Example 4: Cu Substrate/V Coating Layer Having a Thickness of 100 nm, First Active Material Layer (Metal-Carbon Layer) Having a Thickness of 7 μm A negative electrode and a solid-state secondary battery were prepared in substantially the same manner as in Example 1, except that the Ti thin film coating layer disposed on the Cu foil was changed to a V thin film coating layer. Cu had a Mohs hardness of 3.0, and V had a Mohs hardness of 7.0.

Example 5: Cu Substrate/W Coating Layer Having a Thickness of 100 nm, First Active Material Layer (Metal-Carbon Layer) Having a Thickness of 7 μm A negative electrode and a solid-state secondary battery were prepared in substantially the same manner as in Example 1, except that the Ti thin film coating layer disposed on the Cu foil was changed to a W thin film coating layer. Cu had a Mohs hardness of 3.0, and W had a Mohs hardness of 7.5.

Example 6: Cu Substrate/Cr Coating Layer Having a Thickness of 100 nm, First Active Material Layer (Metal-Carbon Layer) Having a Thickness of 7 μm A negative electrode and a solid-state secondary battery were prepared in substantially the same manner as in Example 1, except that the Ti thin film coating layer disposed on the Cu foil was changed to a Cr thin film coating layer. Cu had a Mohs hardness of 3.0, and Cr had a Mohs hardness of 8.5.

Example 7: Ni Substrate/Cr Coating Layer Having a Thickness of 100 nm, First Active Material Layer (Metal-Carbon Layer) Having a Thickness of 7 μm A negative electrode and a solid-state secondary battery were prepared in substantially the same manner as in Example 6, except that a 10 μm-thick Ni foil was used instead of the Cu foil as a first metal substrate. Ni had a Mohs hardness of 4.0, and Cr had a Mohs hardness of 8.5.

Example 8: SUS Substrate/Cr Coating Layer Having a Thickness of 100 nm, First Active Material Layer (Metal-Carbon Layer) Having a Thickness of 7 μm A negative electrode and a solid-state secondary battery were prepared in substantially the same manner as in Example 6, except that a 10 μm-thick stainless steel (SUS 304) sheet was used instead of the Cu foil as a first metal substrate.

Stainless steel had a Mohs hardness of 5.5, and Cr had a Mohs hardness of 8.5.

Example 9: Cu Substrate/Ti Coating Layer Having a Thickness of 100 nm, First Active Material Layer (Metal-Carbon Layer) Having a Thickness of 3 μm A negative electrode and a solid-state secondary battery were prepared in substantially the same manner as in Example 1, except that the thickness of the first negative electrode active material layer was changed to 3 μm.

Example 10: Cu Substrate/Ti Coating Layer Having a Thickness of 100 nm, First Active Material Layer (Metal-Carbon Layer) Having a Thickness of 15 μm A negative electrode and a solid-state secondary battery were prepared in substantially the same manner as in Example 1, except that the thickness of the first negative electrode active material layer was changed to 15 μm.

Example 11: Bi-Cell

A solid-state secondary battery was prepared in substantially the same manner as in Example 1, except that a positive electrode active material layer and a gasket each are arranged on both sides of the positive electrode current collector to prepare a positive electrode layer, and a solid electrolyte layer and a negative electrode layer are sequentially arranged on each of the both sides of the positive electrode layer to prepare a battery.

Comparative Example 1: Cu Substrate/First Active Material Layer (Metal-Carbon Layer) Having a Thickness of 7 μm, Ti Coating Layer-Free A negative electrode and a solid-state secondary battery were prepared in substantially the same manner as in Example 1, except that a Cu foil having a thickness of 10 μm was used as the negative electrode current collector. Therefore, the Ti thin film coating layer was omitted.

Comparative Example 2: Ni Substrate/First Active Material Layer (Metal-Carbon Layer) Having a Thickness of 7 μm, Ti Coating Layer-Free A negative electrode and a solid-state secondary battery were prepared in substantially the same manner as in Example 1, except that a Ni foil having a thickness of 10 μm was used as the negative electrode current collector. Therefore, the Ti thin film coating layer was omitted.

Comparative Example 3: SUS Substrate/First Active Material Layer (Metal-Carbon Layer) Having a Thickness of 7 μm, Ti Coating Layer-Free A negative electrode and a solid-state secondary battery were prepared in substantially the same manner as in Example 1, except that a SUS sheet having a thickness of 10 μm was used as the negative electrode current collector. Therefore, the Ti thin film coating layer was omitted.

Reference Example 1: Gasket Member-Free

A negative electrode and a solid-state secondary battery were prepared in substantially the same manner as in Example 1, except that a gasket was not used when preparing a positive electrode layer.

Evaluation Example 1: Charging/Discharging Test

The charging/discharging characteristics of each of the solid-state secondary batteries prepared in Examples 1 to 11 and Comparative Examples 1 to 3 were evaluated through charging/discharging tests below. The charging/discharging tests were performed by placing the solid-state secondary batteries in a constant-temperature chamber of 60° C.
In the first cycle, the batteries were charged with a constant current of 0.6 mA/cm2 for 12.5 hours until the battery voltage was 3.9 V to 4.25 V. Subsequently, the batteries were discharged with a constant current of 0.6 mA/cm$^2$ for 12.5 hours until the battery voltage was 2.5 V.

From the second cycle on, the batteries were charged and discharged under the same conditions as in the first cycle.

The capacity retention rate was evaluated by the number of cycles having a discharging capacity corresponding to 95% or greater of the discharging capacity (standard capacity) in the first cycle.

Some of the measurement results are shown in Table 1 below.

TABLE 1

|  | First metal current collector | Second metal coating layer | Second metal Mohs hardness | Second metal coating layer Thickness [nm] | Thickness of first negative electrode active material layer [um] | Capacity Retention rate Cycle |
|---|---|---|---|---|---|---|
| Example 1 | Cu | Ti | 6.0 | 100 | 7 | 70 |
| Example 2 | Cu | Ti | 6.0 | 200 | 7 | 80 |
| Example 3 | Cu | Ti | 6.0 | 300 | 7 | 100 |
| Example 4 | Cu | V | 7.0 | 100 | 7 | 90 |
| Example 5 | Cu | W | 7.5 | 100 | 7 | 120 |
| Example 6 | Cu | Cr | 8.5 | 100 | 7 | 130 |
| Example 7 | Ni | Cr | 8.5 | 100 | 7 | 130 |
| Example 8 | SUS | Cr | 8.5 | 100 | 7 | 130 |
| Example 9 | Cu | Ti | 6.0 | 100 | 3 | 40 |
| Example 10 | Cu | Ti | 6.0 | 100 | 15 | 100 |
| Comparative Example 1 | Cu | — | — | — | 7 | 10 |
| Comparative Example 2 | Ni | — | — | — | 7 | 30 |

The solid-state secondary batteries of Examples 1 to 8 and 10 had 70 cycles or more of keeping a discharging capacity of 95% or greater. Therefore, the solid-state secondary batteries of Examples 1 to 8 and 10 showed an improved capacity retention rate over Comparative Examples.

In addition, as shown in Examples 1 to 3, the capacity retention rate was further improved when the thickness of the second coating layer increased.

In addition, as shown in Examples 4 to 8, the capacity retention rate was further improved when the Mohs hardness of the second coating layer metal increased.

The solid-state secondary battery of Example 10 had an improved capacity retention rate compared to the solid-state secondary battery of Example 1, but the total capacity of the solid-state secondary battery of Example 10 was relatively reduced compared to Example 1 due to an increase in irreversible capacity.

It is believed, without being bound by any particular theory, that the improved lifespan was achieved due to preventing or reducing the deterioration of the first metal substrate by coating a second metal layer having a high hardness on the first metal substrate.

in contrast, the solid-state secondary batteries of Comparative Examples 1 and 2 employing a negative electrode without containing a second metal layer with a high hardness had less than 40 cycles of keeping a discharging capacity of 95% or greater. Therefore, the solid-state secondary batteries of Comparative Examples 1 and 2 showed a reduced capacity retention rate.

In particular, the lifespan of the solid-state secondary battery of Comparative Example 1 in which a Cu current collector having a low Mohs hardness was employed as a negative electrode was the lowest, at least in part due to a side reaction with a sulfide in the electrolyte.

After the charging of the first cycle in the solid-state secondary batteries of Examples 1 to 10 was completed, SEM images of the cross sections of these batteries were measured, and it was confirmed that a lithium metal layer corresponding to the second negative electrode active material layer was formed between the first negative electrode active material layer and the negative electrode current collector.

It was confirmed that the solid-state secondary battery of Example 11 showed excellent cycle characteristics as well.

Evaluation Example 2: Observation of Cracks after Preparing Solid-State Battery

Cross-sections of the solid-state secondary batteries prepared in Examples 1 to 11, Comparative Examples 1 to 3 and Reference Example 1 were observed using a scanning electron microscope (SEM) to observe whether cracks penetrating the solid electrolyte layer were caused.

In the solid-state secondary batteries prepared in Examples 1 to 11 and Comparative Examples 1 to 3, cracks in the solid electrolyte layer were not found.

In contrast, in the solid-state secondary battery of Reference Example 1, a number of cracks in the solid electrolyte layer were found at the corners of the positive electrode layer.

In addition, in the solid-state secondary battery of Reference Example 1, a short circuit was caused in less than 10 cycles during charging/discharging under the conditions of Evaluation Example 1, resulting in poor lifespan characteristics.

Accordingly, it was confirmed that in the solid-state secondary batteries of Examples 1 to 11, cracks of the solid electrolyte layer were prevented (or substantially reduced) during the manufacturing of batteries when an inactive member according to the present embodiments (e.g., a gasket) was used for the positive electrode.

According to one or more embodiments, using a negative electrode having the structure according to embodiments of the present disclosure, deterioration of a negative electrode current collector may be prevented or reduced, and a solid-state secondary battery having improved cycle characteristics may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims and their equivalents.

What is claimed is:

1. A negative electrode comprising:
a negative electrode current collector; and
a first negative electrode active material layer on the negative electrode current collector,
wherein the negative electrode current collector comprises:
a first metal current collector comprising a first metal; and
a coating layer on a top surface and on a side surface of the first metal current collector, the coating layer comprising a second metal, the second metal having a greater Mohs hardness than the first metal, and
wherein the first negative electrode active material layer is only on one side of the negative electrode current collector, the one side being over the top surface, and
wherein the coating layer on the side surface of the first metal current collector is separated from a side surface of the first negative electrode active material layer,
wherein an end of the first negative electrode active material layer extends further than an end of the first metal current collector in an extension direction of the negative electrode and overlaps with the coating layer on the side surface of the first metal current collector in a thickness direction of the negative electrode, and
wherein a negative electrode active material in the first negative electrode active material layer comprises a mixture of first particles comprising amorphous carbon and second particles composed of a metal and/or metalloid, the second particles composed of the metal and/or metalloid being contained in an amount of about 8 wt % to 60 wt % with respect to a total weight of the mixture.

2. The negative electrode of claim 1, wherein the first metal has a Mohs hardness of 5.5 or less.

3. The negative electrode of claim 1, wherein the first metal is at least one selected from copper (Cu), nickel (Ni), stainless steel (SUS), iron (Fe), and cobalt (Co).

4. The negative electrode of claim 1, wherein the second metal has a Mohs hardness of 6.0 or more.

5. The negative electrode of claim 1, wherein the second metal is at least one selected from titanium (Ti), manganese (Mn), niobium (Nb), tantalum (Ta), iridium (Ir), vanadium (V), rhenium (Re), osmium (Os), tungsten (W), chromium (Cr), boron (B), ruthenium (Ru), and rhodium (Rh).

6. The negative electrode of claim 1, wherein the coating layer is 1 μm or less in thickness.

7. The negative electrode of claim 1, wherein the coating layer is inert to a sulfide-based solid electrolyte.

8. The negative electrode of claim 1, wherein the first negative electrode active material layer comprises a negative electrode active material and a binder, the negative electrode active material being in a form of particles and having has an average particle diameter of 4 μm or less.

9. The negative electrode of claim 8, wherein the negative electrode active material comprises a carbon-based negative electrode active material and/or a metal and/or metalloid negative electrode active material.

10. The negative electrode of claim 9, wherein the carbon-based negative electrode active material comprises at least one selected from amorphous carbon and crystalline carbon.

11. The negative electrode of claim 8, wherein the metal or metalloid negative electrode active material comprises at least one selected from the group consisting of gold (Au), platinum (Pt), palladium (Pd), silicon (Si), silver (Ag), aluminum (Al), bismuth (Bi), tin (Sn), and zinc (Zn).

12. The negative electrode of claim 1, wherein the first negative electrode active material layer is about 1 μm to about 20 μm in thickness.

13. A solid-state secondary battery comprising:
a positive electrode;
the negative electrode according to claim 1; and
a solid electrolyte layer between the positive electrode and the negative electrode,
wherein the solid electrolyte layer comprises a sulfide-based solid electrolyte.

14. The solid-state secondary battery of claim 13, wherein the positive electrode comprises a positive electrode current collector and a positive electrode active material layer on the positive electrode current collector, and the solid-state secondary battery further comprises an inactive member around a side surface of the positive electrode active material layer, the inactive member being at a peripheral portion of the positive electrode current collector, and extending to an end of the positive electrode current collector.

15. The solid-state secondary battery of claim 13, wherein the sulfide-based solid electrolyte comprises at least one selected from among $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is one of Ge, Zn, or Ga), $Li_2S$—$GeS_2$, $Li_2S$—$SiS_2$—$Li_3PO_4$, and $Li_2S$—$SiS_2$—$Li_pMO_q$ (where p and q are positive numbers, and M is one of P, Si, Ge, B, Al, Ga, or In).

16. The solid-state secondary battery of claim 13, wherein the sulfide-based solid electrolyte comprises at least one selected from $Li_7P_3S_{11}$, $Li_7PS_6$, $Li_4P_2S_6$, $Li_3PS_6$, $Li_3PS_4$, and $Li_2P_2S_6$.

17. The solid-state secondary battery of claim 13, wherein the sulfide-based solid electrolyte comprises an argyrodite solid electrolyte represented by Formula 1:

$Li^+{}_{12-n-x}A^{n+}X^{2-}{}_{6-x}Y^-{}_x$, and 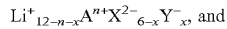 Formula 1 wherein in Formula 1, A is P, As, Ge, Ga, Sb, Si, Sn, Al, In, Ti, V, Nb or Ta,

X is S, Se or Te,

Y is Cl, Br, I, F, CN, OCN, SCN, or N3, and $1 \leq n \leq 5$ and $0 \leq x \leq 2$.

18. The solid-state secondary battery of claim 17, wherein the argyrodite solid electrolyte is at least one selected from $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$).

19. The solid-state secondary battery of claim 13, further comprising a second negative electrode active material layer:

positioned between the negative electrode current collector and the first negative electrode active material layer in the negative electrode, or between the solid electrolyte layer and the first negative electrode active material layer; or positioned between the negative electrode current collector and the first negative electrode active material layer in the negative electrode, and between the solid electrolyte layer and the first negative electrode active material layer, wherein the second negative electrode active material layer is a metal layer comprising lithium or a lithium alloy.

* * * * *